United States Patent [19]

Marcus

[11] 4,087,322
[45] May 2, 1978

[54] AIR CORE POLOIDAL MAGNETIC FIELD SYSTEM FOR A TOROIDAL PLASMA PRODUCING DEVICE

[75] Inventor: Frederick B. Marcus, Clinton, Tenn.

[73] Assignee: The United States of America as represented by the United States Department of Energy, Washington, D.C.

[21] Appl. No.: 720,864

[22] Filed: Sep. 7, 1976

[51] Int. Cl.$^2$ ............................. G21B 1/00; H01J 7/24
[52] U.S. Cl. ........................................ 176/3; 315/111.4
[58] Field of Search ...................... 176/1, 3; 315/111.4, 315/111.7

[56] References Cited

U.S. PATENT DOCUMENTS 3,778,343  12/1973  Coppi et al. ............................... 176/3

OTHER PUBLICATIONS

UWFDM-129, Experimental Thermonuclear Installation, Tokamak T-20, vol. II part 1, pp. 18-25, 39, 43 (10/30/75).
Nuclear Technology, vol. 30, (9/76) pp. 261, 279-283, A Tokamak Experimental Power Reactor.

*Primary Examiner*—Samuel W. Engle
*Assistant Examiner*—S. A. Cangialosi
*Attorney, Agent, or Firm*—Dean E. Carlson; Stephen D. Hamel; Louis M. Deckelmann

[57] ABSTRACT

A poloidal magnetics system for a plasma producing device of toroidal configuration is provided that reduces both the total volt-seconds requirement and the magnitude of the field change at the toroidal field coils. The system utilizes an air core transformer wound between the toroidal field (TF) coils and the major axis outside the TF coils. Electric current in the primary windings of this transformer is distributed and the magnetic flux returned by air core windings wrapped outside the toroidal field coils. A shield winding that is closely coupled to the plasma carries a current equal and opposite to the plasma current. This winding provides the shielding function and in addition serves in a fashion similar to a driven conducting shell to provide the equilibrium vertical field for the plasma. The shield winding is in series with a power supply and a decoupling coil located outside the TF coil at the primary winding locations. The present invention requires much less energy than the usual air core transformer and is capable of substantially shielding the toroidal field coils from poloidal field flux.

3 Claims, 2 Drawing Figures

AIR CORE POLOIDAL MAGNETIC FIELD SYSTEM FOR A TOROIDAL PLASMA PRODUCING DEVICE

BACKGROUND OF THE INVENTION

This invention was made in the course of, or under, a contract with the Energy Research and Development Administration.

Many toroidal plasma producing devices can be characterized in terms of two main magnetic fields, toroidal and poloidal, oriented orthogonally, that combine to form a resultant helical magnetic field, wherein the plasma produced in the device is a diffuse toroidal column confined on a nested complex of magnetic surfaces composed of the helical magnetic field lines.

In these devices, the toroidal component is set up by a circular array of coils known as the toroidal field coils (or simply TF coils) that are distributed around the toroidal plasma chamber. The poloidal component in these devices comes from a toroidal electric current that flows inside the plasma column itself and coils wound in the toroidal direction. This plasma toroidal current is created by a toroidal electric field produced by a transformer which consists of a set of primary windings that were wrapped around an external iron core and yoke, and the plasma current itself constitutes the single-turn secondary winding of the transformer. The primary windings are also known as the primary ohmic heating (primary-OH) windings.

Without the toroidal electric current, the plasma cannot be maintained in equilibrium in the toroidal magnetic field. In the presence of the toroidal current, however, equilibrium becomes possible. Expansion in the direction of the major radius is restricted by the effects of either a conducting shell surrounding the plasma or by another set of windings that produce what is known as the equilibrium magnetic field or vertical field (VF). Even when a conducting shell is sufficient to prevent the plasma expansion, a VF winding is still used for precise control of the position of the plasma column.

The poloidal field system will be understood herein to include the components for producing the equilibrium field in addition to those for initiating and driving the main plasma current. A number of poloidal systems are now in use or planned worldwide, and they represent a variety of design philosophies. It is convenient to group these alternative designs according to whether an iron core or an air core is used. The traditional choice for the poloidal system is an iron core because air cores have servere stray magnetic field problems not present in iron core designs. In iron core systems the stray magnetic flux is channeled into an iron yoke.

If an unsaturated iron core is present, the primary windings may be wrapped directly on the iron core. Alternatively, they may be closely wrapped near the plasma to reduce the stored magnetic energy in which case they will also shield the TF coils from stray magnetic flux. In some machines, the leakage flux from the primary winding is used to provide part of the equilibrium vertical field. For air core machines, the primary windings may be either wrapped inside or outside of the toroidal field coils.

With regard to the production of the vertical magnetic field in either iron or air core machines, the equilibrium vertical field was provided in all the earlier devices by eddy currents in a conducting shell and this was supplemented by externally-driven vertical field windings. More recently, machines without a conducting shell have been operated successfully, thereby making the use of a shell not necessarily essential.

In order to produce a large hot plasma having a high plasma current in one of these toroidal devices and thereby produce a copious quantity of neutrons, it will probably be necessary to provide superconducting coils for the confining toroidal magnetic field. This is in order to minimize electrical power dissipation in the coils.

An iron core system is not desirable because, for toroidal coils of a given bore, it is desirable to minimize the major radius. This, however, restricts the area available for an iron core. Iron saturates at approximately 16-16 kilogauss, so by restricting the amount of iron, the available volt-seconds value is limited. Since the volt-seconds requirement for a large device is very imprecise, there is considerable doubt that an iron core can provide sufficient volt-seconds for a high plasma current machine. A less important objection is that a back-biased iron core only stores a small amount of energy, meaning that the inductively stored energy is less than an air core design can provide.

To counter these problems, an air core transformer is used. The primary windings in such a system are run at full reverse current before the plasma discharge is initiated. An air core system thus has the advantage of providing a large inductive energy stored for initiating the plasma discharge. On the other hand, it has a much larger total energy requirement than an equivalent iron core system.

Air core systems in the past have not had to contend with superconducting TF windings. Instead, cooled copper toroidal coils, not subject to quenching due to stray magnetic fields, have been utilized. Specifically, these stray fields are pulsed fields that originate both in the windings that generate poloidal fields and from the changing plasma current, and they are especially prevalent during disruptive plasma instabilities.

Since rapidly changing poloidal fields may be utilized or required for plasma initiation in a large device, there exists a problem in that such changing fields can possibly quench the superconductors utilized in the magnetic coils. Other problems of stray fields in air core systems include the contribution of these fields to the stored energy requirements, particularly those that are required for the air core systems. It should also be noted that the use of an iron transformer is not desired or necessarily required in the operation of air core systems.

Thus, since the use of iron cores is not desirable, there exists a need to overcome the above-mentioned problems when an air core system is used in a large device. The present invention was conceived to meet this need in a manner to be described hereinbelow.

SUMMARY OF THE INVENTION

It is the object of the present invention to provide an air core poloidal magnetic system for a plasma producing device of toroidal configuration that meets the demand for a large transformer flux swing to drive large, extended plasma current pulses in the presence of a limited central core area, to shield the superconducting toroidal field coils of the device from stray pulsed fields, and to reduce the stored energy requirements.

The above object has been accomplished in the present invention by providing an air core primary-OH winding for driving the plasma current, a shield-VF winding, and a decoupling winding; all arranged and operated in a unique fashion. The air core primary winding is located outside the superconducting TF coils and provides the principal plasma driving voltage. Its windings are distributed so that its magnetic flux does not intersect the TF coils. The shield-VF winding is closely coupled to the plasma inside the TF coils and consists of a distribution of series-connected conductors that approximately reproduce the eddy current distribution of a closed conducting shell. The shield-VF winding is connected in series with the decoupling winding that has an equal but opposite number of turns, and the decoupling winding is located with the primary winding so as to generate the same magnetic field pattern as the primary winding. The shield-VF winding provides the shielding function for the TF coils and in addition serves to produce the equilibrium vertical field. The shield coil can provide for precise plasma centering at a particular value of plasma pressure. Alternatively, and perhaps preferably, a further set of coils, called vertical trim coils, that are located outside of the TF coils can be provided to perform the centering function. The above coils can all be superconducting except the shield-VF coil, which is a cooled copper conductor, for example.

DESCRIPTION OF THE PREFERRED EMBODIMENT

Figure 2:
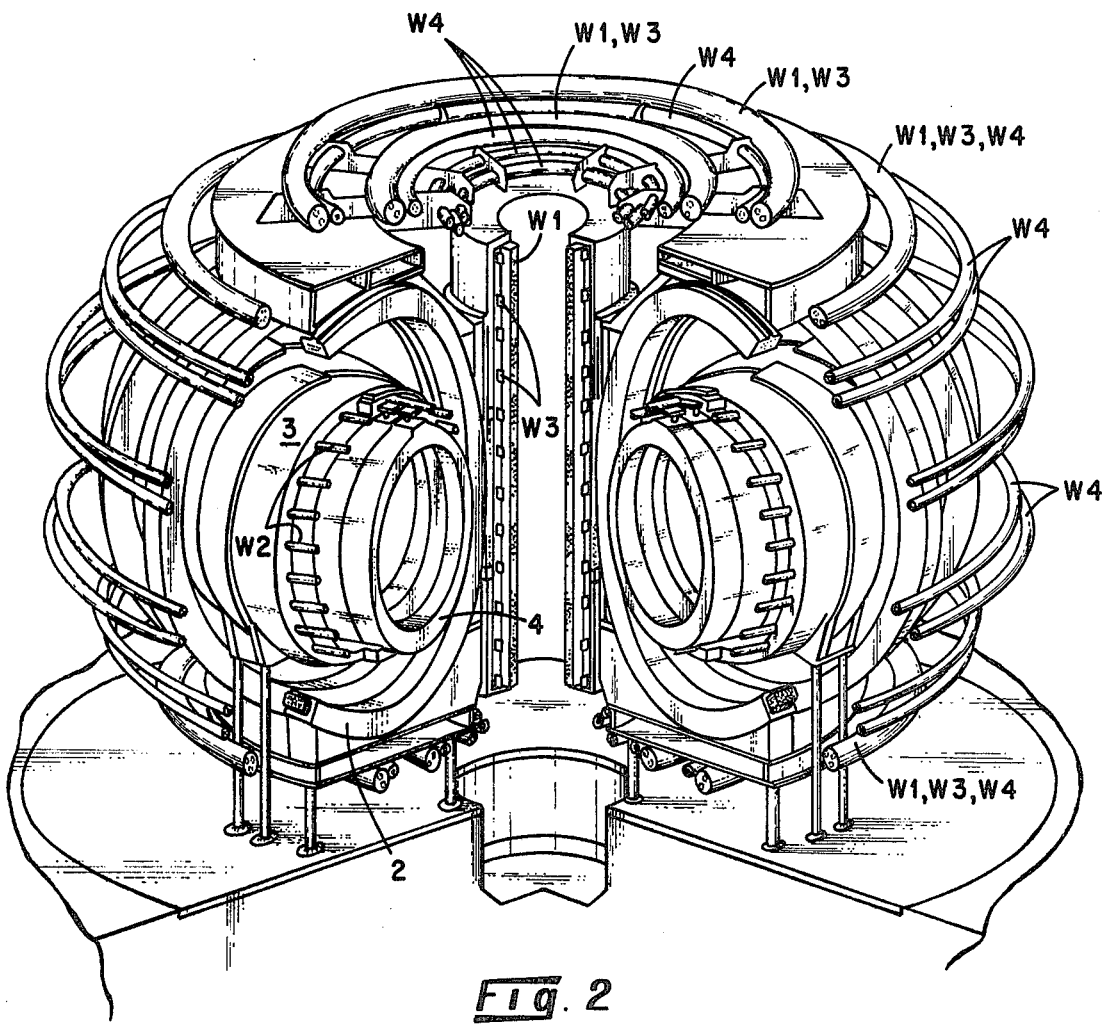
FIG. 2 is a cut-away view of the invention implemented in a toroidal plasma producing device illustrating the arrangement of the various magnetic coils.

A toroidal device for producing a hot plasma that illustrates the present invention is shown in FIG. 2 of the drawings. The device utilizes conventional toroidal field coils and an air core ohmic heating winding, and in accord with the present invention provides a shield winding and a decoupling winding arranged and operated in a unique manner to substantially reduce the amount of electrical energy normally required for air core transformers of the prior art, while at the same time shielding the toroidal field coils from poloidal magnetic flux in a manner to be described below.

In the device of FIG. 2, a blanket 4 encompasses the annular plasma volume, and a neutron shield 3 encompasses the blanket 4.

Encompassing the shield 3 are a plurality (20, for example) of toroidal field coils 2 and these field coils are oval in shape, for example. It should be understood that the device of FIGS. 1 and 2 is an example of one device in which the present invention may be utilized, and that the presence of a blanket and neutron shield are not necessary to the operation of the present invention.

It should be understood that the device of FIG. 2 may be provided with a plurality of injectors, not shown, for the injection of deuteron (neutral ions) into the toroidal annular plasma forming chamber.

Torus vacuum pumping for the device of FIG. 2 is provided by means of a plurality of cryosorption pumps, not shown, connected to the torus plasma containing chamber by means of associated 1 meter diameter ports, not shown.

Figure 1:
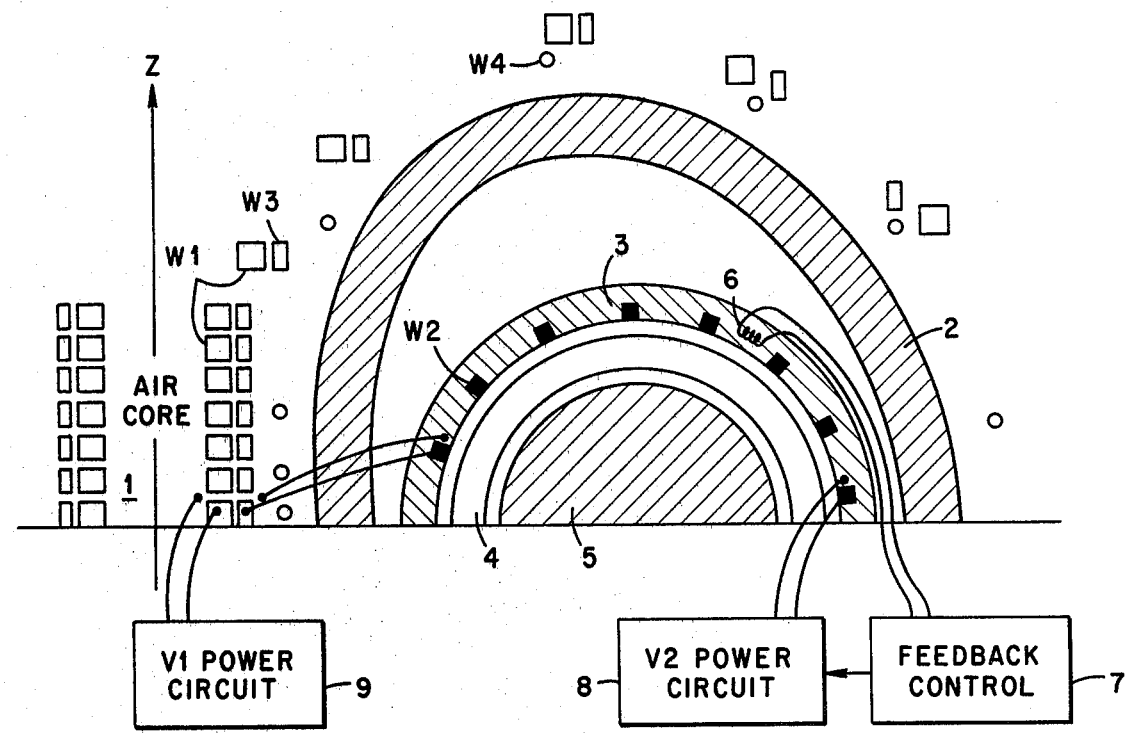
FIG. 1 is a partial schematic illustration of the poloidal magnetic field system of the present invention.

An air core, ohmic heating primary winding W1 is provided for driving the plasma current and is located outside of the TF coils 2 (see also FIG. 1). A shield-VF winding W2 is closely coupled to the plasma inside the TF coils and consists of a distribution of series-connected conductors that approximately reproduce the eddy current distribution of a closed conducting shell. A decoupling winding W3 is also located outside of the TF coils 2 and is wound adjacent to the winding W1, as shown in FIGS. 1 and 2.

The shield-VF winding W2 is connected in series with the decoupling winding W3 that has an equal but opposite number of turns. Winding W3 is located with the primary-OH winding W1 so as to generate the same magnetic field pattern as the primary-OH winding W1. The shield-VF winding W2 provides the shielding function for the TF coils 2 and in addition serves to produce the equilibrium vertical field. The shield winding also provides plasma centering at a particular plasma pressure. Alternatively, and preferably, a further set of trim windings W4 that are located outside of the TF coils can perform this centering function, with only a small additional vertical field.

Any or all of the above coil windings may be superconducting except the shield-VF winding, which must be nonsuperconducting. The shield-VF winding is a cooled copper conductor coil, or alternatively a liquid metal conductor coil, for example. The shield-VF coil can be operated at cryoresistive temperatures if desired.

The main source of electromotive force for the plasma 5 is the air core ohmic heating winding W1 where the flux is returned externally by the air core winding W1 and supplies the principal volt-seconds capability of the device. For a large device of FIGS. 1 and 2, the magnetic field in the constricted midplane region of the torus due to W1 can reach several Tesla, allowing a much larger flux swing than would be possible with an iron core device. The primary winding W1 is driven by a V1 power circuit 9 as illustrated in FIG. 1.

The winding W2 is wrapped inside the toroidal field coils 2 in a closely-coupled fashion to the plasma 5. By means of a feedback control 7, as governed by a sensing coil 6, the total current flow in winding W2 is arranged to be equal and opposite to the plasma current in order to make the magnetic field outside winding W2 due to the plasma approximately zero, i.e., to cancel the poloidal magnetic field of the plasma at the toroidal field coils 2. The winding W2 is distributed in such a manner as to provide the equilibrium vertical field with the correct magnitude and decay index for the plasma.

The analogy of a closed perfectly-conducting shell gives a good demonstration of the winding W2's dual function. If a current is generated inside a conducting shell, eddy currents in the shell wall will prevent any plasma magnetic field from appearing outside the shell. Also, if the plasma shifts, eddy currents will generate a compensating vertical field. In practice, such a winding design is obtained by the superposition of two current distributions which require: (1) a winding with full plasma current that creates zero magnetic field in the plasma region, and (2) a vertical field winding with a total of zero ampere turns and having an optimal decay index for vertical and horizontal stability. The closeness of the winding W2 to the plasma allows flexibility in the choice of decay index. A value of 0.5, for example, gives good stability against plasma vertical displacements.

One effect of having a winding such as W2 in the poloidal magnetic system is that any voltage produced by a flux change in winding W1 would normally produce a current in winding W2. Therefore, the winding W3, which is closely wrapped to winding W1 has an equal and opposite number of turns as winding W2.

Winding W3 is thus a decoupling winding, functioning to decouple the shield winding W2 from the ohmic heating driving voltage that is applied to W1. The winding W3 must have its currents distributed in the same fashion as winding W1 in order to create the same flux pattern. Windings W2 and W3 are connected in series with a V2 power circuit 8 so that winding W1 induces no net voltage in W2 and W3. Due to the locations of the respective windings, the plasma coupling to winding W2 is very good, and to winding W3 is very poor. Thus, the plasma current tends to keep an equal and opposite current to that in winding W2 (allowing for the turns ratio). To keep these currents exactly equal, a plasma current sensing circuit 6 measures the flux outside winding W2 and drives the power circuit 8 by means of the control 7 so as to keep the flux at zero. In other words, the V2 power circuit 8 maintains equality of the total plasma and shield-VF coil currents at a relatively low level of energy expenditure, aside from resistive losses. In steady operation, the plasma, W2, and W3 currents are constant and the W1 changing flux provides for the plasma resistive losses. The combination of the shield (W2) and decoupling (W3) coils can thus be viewed as an open resistive, conducting shell with a fixed current distribution providing a field free region between its surfaces.

In constructing the shield coil to exactly equal the plasma current for shielding purposes (shielding can only be complete when the shield coil current is equal and opposite to the plasma current), some of the plasma position stabilizing flexibility is sacrificed. To provide the remainder of the vertical field, a set of trimming VF windings W4 are wrapped around the torus, outside of the TF coils 2, and carry a net zero ampere-turns. The shielding and trim currents are separately controlled. The power circuits for the coils W4 are not shown in the drawings.

This added vertical field due to the trim coils W4 intersects the TF coils, but is nevertheless acceptable because it needs to change only slowly in time as the poloidal magnetic field pressure increases during the quasi-stationary phase of the plasma discharge. Whether or not the trim coils W4 are used depends on how perfectly one wants to cancel plasma effects with the shield VF coils.

As discussed above, the principal object of the present invention is to shield the toroidal field coils in a toroidal plasma producing device from stray pulsed magnetic fields, thus resulting in a substantial reduction in the total electrical energy requirements of the various magnetic systems of the device. A typical operating cycle for the various magnetic coils of the present invention is as follows:

1. Starting from zero current, the primary winding W1 is charged to full reverse current with zero current in the other windings W2, W3, and W4. This may take a number of seconds.

2. This reverse current is then driven toward full forward current with the V1 power circuit 9, inducing a current in the plasma but not directly in the shield VF (W2 winding) and decoupling circuit (W3 winding). The plasma current induces nearly equal and opposite amp-turns in the shield-VF coils W2, depending upon the relative coupling. The V2 power circuits 8 increases the current level in the shield (W2) and decoupling (W3) windings to that of the plasma. Most of the current in the shield winding is thus produced by induction from the plasma, and the magnetic flux external to the shield winding W2 is greatly reduced over conventional designs.

3. The primary-OH winding W1 voltage is changed at a suitable rate by the V1 supply to bring the plasma current to full value. During this time (up to a few seconds) the ohmic heating coil (W1) current rises to some fraction of its original value, but with the opposite sign. During the time the plasma is maintained, the primary-OH current increases slowly while supplying the plasma resistive losses. The current in the trim VF windings W4 is varied to keep the plasma centered. The shield (W2) and plasma currents are maintained in equality, since if they differ, undesired stray magnetic flux will appear.

4. A negative voltage is applied to the primary winding to drive the plasma current to zero.

The above cycle is repeated over and over again for as many cycles as is desired, and during each cycle when a hot plasma is being maintained in the torus vacuum chamber, there are produced a substantial number of neutrons directed at the wall of the vacuum chamber. Thus, the device has a utility as a neutron source.

It can be seen from the above described device that the arrangement of the various magnetic windings (W2, W3 and W4) with respect to the primary-OH winding W1 provides a system which is substantially capable of shielding the toroidal field coils of the device from stray magnetic flux. It has been determined that the above arrangement and operation of the windings W2, W3 and W4 should result in a reduction of at least a factor of 6 in the pulsed fields in the vicinity of the toroidal field coils compared to the field that the plasma alone would produce at the toroidal field coils.

This invention has been described by way of illustration rather than by limitation and it should be apparent that it is equally applicable in fields other than those described. For example it can find application in experimental research devices leading to the ultimate goal of producing controlled thermonuclear reactions. An example of one such device is described in the Oak Ridge National Laboratory Report: ORNL-TM-5042, dated November 1975.

What is claimed is:

1. In a toroidal plasma confinement device having poloidal and toroidal magnetic fields for confining a toroidal plasma column with a plasma current induced therein along a circular equilibrium axis in a torus vacuum cavity, said poloidal magnetic field being provided by an air core primary magnetic winding, said device further including a plurality of toroidal field coils encompassing said plasma current for providing said toroidal magnetic field, the improvement comprising a magnetic shield winding positioned between the said toroidal field coils and said plasma current, a magnetic decoupling winding wound adjacent to said air core winding, said shield winding having an equal but opposite number of turns as said decoupling winding, a first power circuit, said primary winding being connected in series with said first power circuit, a second power circuit, said shield winding being connected in series with said decoupling winding and to said second power circuit, sensing means mounted near to said plasma current for sensing the plasma current flux from the vacuum cavity, and a feedback control circuit coupled between said sensing means and said second power circuit to thereby control the current to said series connected shield winding and decoupling winding to thus maintain said total shield winding current equal and opposite to said plasma current, whereby during operation of said device to produce an energetic plasma within said vacuum cavity, said toroidal field coils are substantially shielded from any stray pulsed magnetic fields.

2. The device set forth in claim 1, and further including a set of magnetic trim windings having a net zero ampere-turns, said trim windings being utilized for centering said plasma in said vacuum cavity during operation of said device when such is required.

3. The device set forth in claim 2, wherein said toroidal field coils are superconducting.

* * * * *